June 19, 1951  R. A. HOLSTEDT  2,557,432
DEODORIZER FOR REFRIGERATORS AND OTHER ENCLOSURES
Filed July 1, 1948
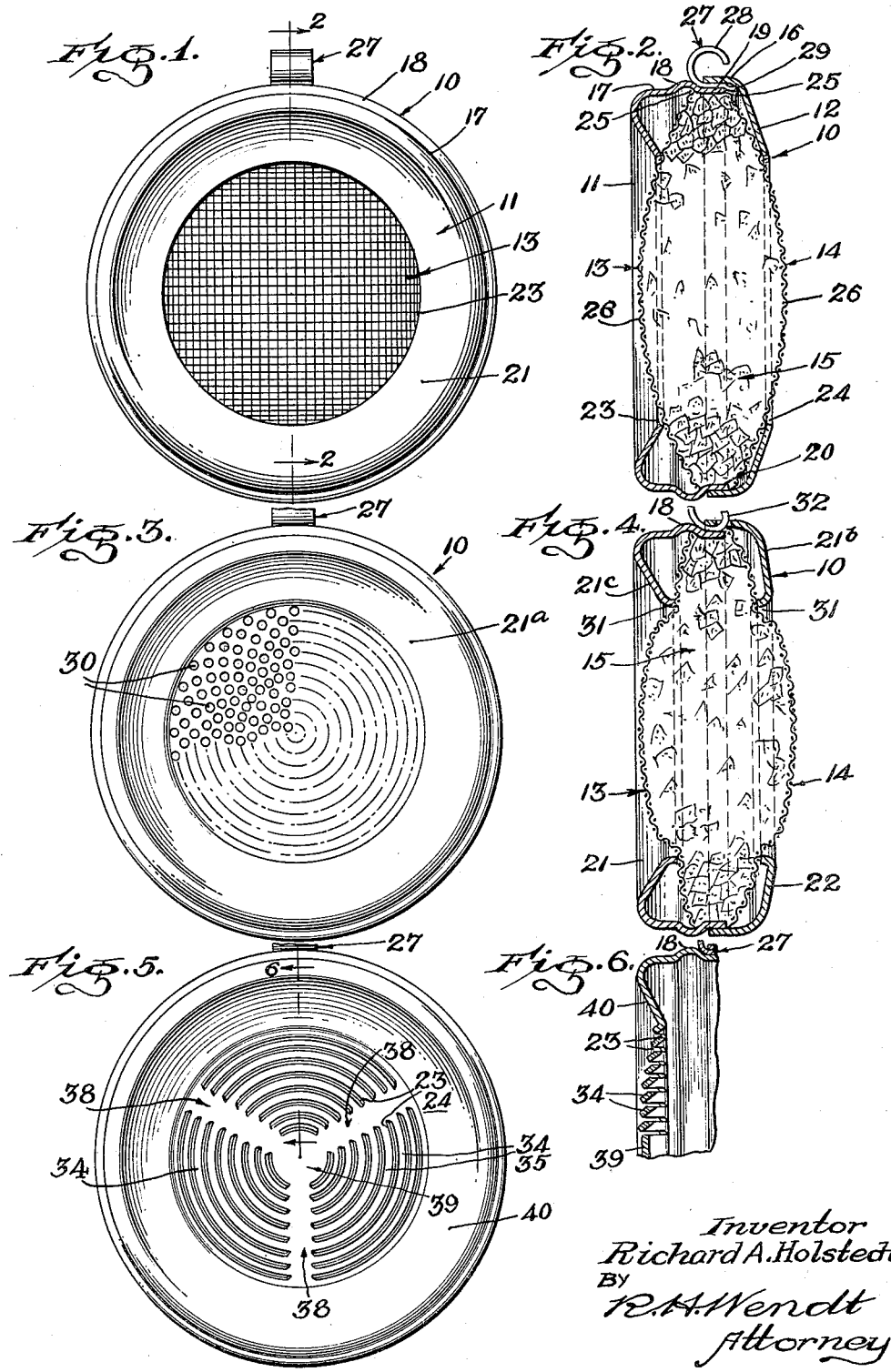
Inventor
Richard A. Holstedt
By
R. H. Wendt
Attorney.

UNITED STATES PATENT OFFICE 2,557,432

DEODORIZER FOR REFRIGERATORS AND OTHER ENCLOSURES

Richard A. Holstedt, Evanston, Ill.

Application July 1, 1948, Serial No. 36,460

14 Claims. (Cl. 21—108)

The present invention relates to deodorizer for refrigerators and other enclosures, and is particularly concerned with the provision of an improved deodorizer which employs activated carbon in the powdered or granular form as the absorbent agent.

One of the objects of the invention is the provision of an improved deodorizer for the purposes described, which is adapted to absorb all kinds of odors, vapors and gases so as to reduce to a minimum the food flavors which are caused by the storage of various kinds of food in an uncovered condition in a refrigerator.

Another object of the invention is the provision of an improved deodorizer of the class described, which is embodied in a durable metal container adapted to withstand corrosion, adapted to protect the filler of carbon and adapted to make a maximum amount of the activated carbon available for contact with the air in the refrigerator and other enclosures.

Another object is the provision of an improved deodorizer which can be reactivated at any time by heating it in an oven for a predetermined period of time and at a predetermined temperature, or by exposing the deodorizer to the action of radiation from the sun for a longer period of time.

Another object is the provision of an improved deodorizer which is simple, inexpensive, adapted to be manufactured with a minimum amount of machinery or machine operations, small in size occupying little space in the refrigerator, sanitary, and capable of being hung from a shelf in such manner that it does not occupy shelf space and there is little chance of contamination by the spilling of liquids on the deodorizer.

Other objects and advantages of the invention will be apparent from the following description and the accompanying drawings, in which similar characters of reference indicate similar parts throughout the several views.

Referring to the single sheet of drawings accompanying this specification,

Fig. 1 is a front elevational view of a deodorizer embodying the invention;

Fig. 2 is a vertical sectional view, taken on the plane of the line 2—2 of Fig. 1, looking in the direction of the arrows;

Fig. 3 is a view similar to Fig. 1 of a modification employing apertures in the housing, instead of wire screening;

Fig. 4 is a view similar to Fig. 2 of another modification;

Fig. 5 is a view similar to Fig. 1 of another modification employing louvers, instead of wire screen; and Fig. 6 is a fragmentary sectional view of the modification of Fig. 5, taken on the plane of the line 6—6 of Fig. 5.

Referring to Figures 1 and 2, the present deodorizer which is indicated in its entirety by the numeral 10, preferably includes a pair of complementary housing members 11 and 12, which are apertured to expose the filler at wire screens 13 and 14 and provided with an activated carbon filler 15.

The housing members 11 and 12 may consist of stamped sheet metal members of any desired shape in elevation, but are preferably made round, as shown in Figure 1. Thus each housing member has a cylindrical wall 16, 17.

The cylindrical wall 17 of one of the housing members is preferably formed with an annular rib 18 and with the overlapping cylindrical portion 19 that is adapted to be received inside the cylindrical wall 16 of the other housing 11.

The rib 18 serves as a stop for limiting the telescoping of the two housings, but in some embodiments of the invention the rib 18 may be eliminated and the telescoping of the two housing members may be limited by engagement of the edge 20 with the inside of the housing 11.

Each housing member preferably has a substantially plane side surface 21, 22, and these side surfaces are provided with centrally located circular apertures 23, 24. The apertures 23, 24 are preferably made as large as possible, leaving only sufficient of the housings 11 and 12 to serve as a supporting frame for the wire screen 13, 14 and filler 15, and exposing a maximum of the filler through the screen.

The screen 13, 14 is preferably made of suitable wire which will resist corrosion, such as copper or bronze; but in some cases may be made of galvanized screen or other screen suitably coated to resist corrosion. In some embodiments of the invention the screen may be made of initially plastic and chemically inert composition, and the two housing members may also be molded of the same chemically inert initially plastic composition such as, for example, cellulose acetate, cellulose acetate butyrate, polystyrene or methyl methacrylate.

The activated carbon which is employed is preferably in a pulverized or granular state of a predetermined size such as, for example, a powder which will pass a screen having four wires to the inch and which will be stopped by a screen having ten wires to the inch. The screening employed is preferably of substantially smaller mesh than is required to stop passage of the powder, such as, for example fifteen to eighteen wires to the inch.

The screen members 13 and 14 are preferably circular in shape, the circular edges 25 of the screen being adapted to engage the inside of the cylindrical walls 16 and 17 frictionally to retain the screen in place during assembly. The screen is preferably preformed with a partially spherical bulge 26 which protrudes from each of the housing apertures 23, 24, increasing the area of exposure of the screen and carbon and subjecting the carbon, at least in some direction, to up and down currents of air also.

In some embodiments of the invention the screen need not terminate at the edge 25, but may have a partially cylindrical portion engaging the inside of the cylindrical walls 16 and 17 and, in fact, with wire screen such a result may be attained by using an oversize circular screen and bending it as it is pressed into each of the housing members 16 and 17 to conform to the inside shape of the housing members.

The housing 12 is preferably provided with a hook 27 for suspending the deodorizer from one of the cross members of a wire shelf in the refrigerator. Such a hook may be formed of a narrow strip of sheet metal having an upper hook formation 28, and a lower horizontal flange 29 that engages the rib 18 and is caught between the flanges 16 and 19 of the two housing members, where it is held frictionally. The two housing members are also held together by a close frictional fit.

The space inside the housing 12 is preferably substantially filled with the activated carbon filling 15, and this may be accomplished by substantially immersing both housing members in a supply of the powdered carbon while they are being pressed together, care being taken not to include more of the filler than can be accommodated in the housing.

Sufficient space is preferably left inside the housing so that the activated carbon filling can be moved about by shaking or turning, thus keeping the filler in a loose conditiion and permitting the filler to be moved to new positions of exposure by shaking and/or turning the deodorizer for this purpose.

Referring to Figure 3, this is a modification which may be constructed substantially the same as that of Figure 1, except that the screen is eliminated and the openings 23, 24 are eliminated. Instead the closed facings 21a of such a device are provided with punched or drilled apertures 30 as close together as possible, the apertures being of such size as to prevent the passage of the carbon used as a filler.

Referring to Figure 4, this is a sectional view of another modification which is substantially similar to Figure 1, except that the apertures are provided with an inwardly turned cylindrical flange 31, and the hook 32 may be of similar shape but may be made of a small wire with an upwardly turned end 33 that passes through a preformed aperture in the wall of the housing member 21b, the housing member 21c being of similar shape but provided with the rib 18.

Referring to Figures 5 and 6, these are two views of another modification in which louvres are preferably employed in the walls of the housing instead of screen, thus saving the expense of the screen which is involved in Figures 1 and 2. Such louvres may be formed with slits and slats cut out of the body of the metal cans, or molded in the molded type of housing, the slits and slats being so small that they do not pass the relatively fine powdered activated carbon. Thus in Figures 5 and 6 the apertures 23, 24 are not present, but the flat side walls 34, 35 are formed with the slits 36 between the slats 37 to expose the activated carbon to the air.

The slats and slits are preferably partially circular in form, as shown in Figure 5, the slats being joined and supported by radially extending flat portions 38 which are integrally joined to a central portion 39 and to the outer annular portion 40 of the side walls 34, 35. When metal is employed it is preferably painted or coated with a suitable paint or enamel capable of preventing corrosion on the inside and outside, and presenting a sanitary appearance in keeping with the interior finish of the refrigerator.

Use and care of the deodorizer

The deodorizer is preferably hung from one of the wires of a refrigerator shelf in such manner as to be arranged with its screen or air apertures extending transversely to the currents of air in the refrigerated space.

For example, in a refrigerator having a centrally disposed evaporator at the top, the deodorizer may be hung on the bottom shelf toward one side since the air currents tend to pass downward in the middle of the box from the evaporator, and upward on both sides to carry the warmer air up to the evaporator where it will be cooled.

When the deodorizer has been used for from six to eight weeks it may be reactivated by hanging it in an oven, such as the ordinary gas oven, by means of its hook 27 on the shelf, and subjecting the deodorizer to a temperature of from 200 to 250 degrees F. for about twenty minutes. This will heat the carbon and its vapor content and such materials as may have condensed on the carbon or have been absorbed or adsorbed, in such manner as to expel the vapors and to render the carbon again as activated as it was in the beginning.

The reactivatiton may also be accomplished by exposing the deodorizer to the hot summer sun for a longer period of time, sufficient to accomplish the same result.

It will thus be observed that I have invented an improved deodorizer which is adapted to be hung from the shelf of a refrigerator in position to be exposed to the convection currents of air which naturally exist in the storage compartment. The present device does not occupy any shelf space and there is less chance of its becoming contaminated by spilled liquids than is the case when it is laid on the shelf. The device is also out of the way, since lower shelf space is not used as much as the other shelf space.

The present device is adapted to absorb all kinds of odors, vapors or gases, reducing to a minimum the mixing of food flavors in the refrigerator without necessity for separate covers or containers for various kinds of feed. For example, butter, potatoes, puddings and ice cubes are very easily contaminated by odors which emanate from cheese, cantaloupes and other melons, onions, sauerkraut, cabbage or the like, but when the present deodorizer is employed it is no longer necessary to cover any of these food products.

The present device may also be used in closets, where it may be hung on one of the clothes hooks and employed to absorb odors emanating from shoes and clothing which have been previously worn, or from clothing which has been previously stored and subjected to moth proofing material, such as moth balls or moth flakes.

The present device is simple, capable of being manufactured at a low cost, adapted to be used for a long period of time, capable of being renewed by reactivation of its carbon in an ordinary kitchen oven, and its housing is of sufficient strength so there is little chance of its being damaged during storage, shipment or use.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a deodorizer, the combination of a supporting frame with a pair of foraminated side walls supported by said frame and forming an enclosure, and a filler of activated and pulverized granular carbon of a size adapted to be retained by said side walls, the filler being exposed to the air at said side walls for absorption of vapors and odors to which the deodorizer is exposed, the said frame comprising a pair of substantially complementary cup-shaped containers adapted to be telescoped one inside the other to form a chamber for the said filler.

2. In a deodorizer, the combination of a supporting frame with a pair of foraminated side walls supported by said frame and forming an enclosure, and a filler of activated and pulverized granular carbon of a size adapted to be retained by said side walls, the filler being exposed to the air at said side walls for absorption of vapors and odors to which the deodorizer is exposed, the said frame comprising a pair of substantially complementary cup-shaped containers adapted to be telescoped one inside the other to form a chamber for the said filler, and a hook member having a supporting flange which is confined and frictionally held between the telescoping parts of said cup-shaped members.

3. In a deodorizer, the combination of a supporting frame with a pair of foraminated side walls supported by said frame and forming an enclosure, and a filler of activated and pulverized granular carbon of a size adapted to be retained by said side walls, the filler being exposed to the air at said side walls for absorption of vapors and odors to which the deodorizer is exposed, the said foraminated side walls being formed of pieces of screen of a predetermined size of mesh adapted to prevent the passage of the pulverized carbon filler, and said screen being retained in place by having its edges frictionally engaging the inside of said frame, the said screen being preformed with a partially spherical bulge protruding from apertures in said frame on each side of the frame to expose a maximum of the filler to the action of vapors.

4. In a deodorizer, the combination of a supporting frame comprising a pair of substantially cup-shaped telescoping containers, one container being frictionally engaged inside the other to retain them in assembly, and said containers being provided with side walls having a multiplicity of apertures of sufficient size to prevent the passage of a pulverized filler, a pulverized filler of activated carbon located in said containers and exposed to the action of vapors at said multiplicity of apertures.

5. In a deodorizer, the combination of a supporting frame comprising a pair of substantially cup-shaped telescoping containers, one container being frictionally engaged inside the other to retain them in assembly, and said containers being provided with side walls having a multiplicity of apertures of sufficient size to prevent the passage of a pulverized filler, a pulverized filler of activated carbon located in said containers and exposed to the action of vapors at said multiplicity of apertures, the container which is received inside the other container having an annular stop rib formed and located to engage the edge of the other container.

6. In a deodorizer, the combination of a supporting frame comprising a pair of substantially cup-shaped telescoping containers, one container being frictionally engaged inside the other to retain them in assembly, and said containers being provided with side walls having a multiplicity of apertures of sufficient size to prevent the passage of a pulverized filler, a pulverized filler of activated carbon located in said containers and exposed to the action of vapors at said multiplicity of apertures, the container which is received inside the other container having an annular stop rib formed and located to engage the edge of the other container, and a hooked-shaped member bent at its lower end to form an attaching flange which is confined between the telescoping portions of said containers and held in such position also by said annular rib.

7. In a deodorizer, the combination of a supporting frame comprising a pair of substantially cup-shaped telescoping containers, one container being frictionally engaged inside the other to retain them in assembly, and said containers being provided with side walls having a multiplicity of apertures of sufficient size to prevent the passage of a pulverized filler, a pulverized filler of activated carbon located in said containers and exposed to the action of vapors at said multiplicity of apertures, the said apertures being in the form of minute narrow slits located between louvers pressed out of the body of said containers.

8. In a deodorizer, the combination of a supporting frame comprising a pair of substantially cup-shaped telescoping containers, one container being frictionally engaged inside the other to retain them in assembly, and said containers being provided with side walls having a multiplicity of apertures of sufficient size to prevent the passage of a pulverized filler, a pulverized filler of activated carbon located in said containers and exposed to the action of vapors at said multiplicity of apertures, the said apertures being in the form of minute narrow slits located between louvers pressed out of the body of said containers, and said louvers extending in a plurality of concentric circles, the louvers being supported by radially extending portions of the bodies of said containers.

9. A deodorizer comprising a pair of metal retaining members, each of said retaining members having a substantially cylindrical side wall and the side walls of said retaining members telescoping one within the other to form a housing, the said housing having relatively large apertures in its opposite sides, a screen member located in said housing over each of said apertures and a filler of pulverized activated carbon in said housing and exposed to the action of vapors through said screens.

10. A deodorizer comprising a pair of metal retaining members, each of said retaining members having a substantially cylindrical side wall and the side walls of said retaining members telescoping one within the other to form a housing, the said housing having relatively large apertures in its opposite sides, a screen member located in said housing over each of said apertures and a filler of pulverized activated carbon in said housing and exposed to the action of vapors through said screens, the granular size of said filler being substantially larger than that which will pass the mesh of the screen employed.

11. A deodorizer comprising a pair of metal retaining members, each of said retaining members having a substantially cylindrical side wall and the side walls of said retaining members telescoping one within the other to form a housing, the said housing having relatively large apertures in its opposite sides, a screen member located in said housing over each of said apertures and a filler of pulverized activated carbon in said housing and exposed to the action of vapors through said screens, the said screen being of sufficient size to have its edges engage the telescoping walls of said metal retaining members.

12. A deodorizer comprising a pair of metal retaining members, each of said retaining members having a substantially cylindrical side wall and the side walls of said retaining members telescoping one within the other to form a housing, the said housing having relatively large apertures in its opposite sides, a screen member located in said housing over each of said apertures and a filler of pulverized activated carbon in said housing and exposed to the action of vapors through said screens, the said screen being of sufficient size to have its edges engage the telescoping walls of said metal retaining members, said apertures being bordered by an inwardly extending cylindrical flange and said screen being preformed with a partially spherical bulge to protrude from said apertures.

13. A deodorizer comprising a pair of metal retaining members, each of said retaining members having a substantially cylindrical side wall and the side walls of said retaining members telescoping one within the other to form a housing, the said housing having relatively large apertures in its opposite sides, a screen member located in said housing over each of said apertures and a filler of pulverized activated carbon in said housing and exposed to the action of vapors through said screens, the said screen being of sufficient size to have its edges engage the telescoping walls of said metal retaining members, said apertures being bordered by an inwardly extending cylindrical flange and said screen being preformed with a partially spherical bulge to protrude from said apertures, and a wire hook member confined between the cylindrical side walls of said members, said hook having an upwardly turned retaining portion extending through an aperture in one of said side walls.

14. A deodorizer comprising a pair of retaining members having tightly telescoping flanges and means providing a plurality of openings to outside air, said retaining members and said means being arranged and constructed to enclose and provide space for the retention of a filler of deodorizing material when the retaining members are telescoped, and a filler of pulverized activated carbon in said space and exposed to the action of vapors through said openings.

RICHARD A. HOLSTEDT.

REFERENCES CITED

The following references are of record in the file of this patent:

UNITED STATES PATENTS

| Number | Name | Date |
|---|---|---|
| 1,787,231 | Bacon | Dec. 20, 1930 |

FOREIGN PATENTS

| Number | Country | Date |
|---|---|---|
| 415,405 | Great Britain | Aug. 22, 1934 |
| 481,693 | Great Britain | Mar. 16, 1938 |